(12) United States Patent
Grinderslev

(10) Patent No.: US 12,152,958 B2
(45) Date of Patent: Nov. 26, 2024

(54) TEST PROBE FOR EXPANDED BEAM CONNECTOR

(71) Applicant: TE Connectivity Solutions GmbH, Schaffhausen (CH)

(72) Inventor: Soren Grinderslev, Hummelstown, PA (US)

(73) Assignee: TE Connectivity Solutions GmbH (CH)

( * ) Notice: Subject to any disclaimer, the term of this patent is extended or adjusted under 35 U.S.C. 154(b) by 0 days.

(21) Appl. No.: 17/985,566

(22) Filed: Nov. 11, 2022

(65) Prior Publication Data
US 2024/0159622 A1  May 16, 2024

(51) Int. Cl.
*G01M 11/08* (2006.01)

(52) U.S. Cl.
CPC .................. *G01M 11/086* (2013.01)

(58) Field of Classification Search
CPC . G01R 3/00; G01R 1/067; G01R 1/07; G01R 1/071; G02B 6/3656; G02B 6/366; G01M 11/086
See application file for complete search history.

(56) References Cited

U.S. PATENT DOCUMENTS

| | | | |
|---|---|---|---|
| 4,846,544 A * | 7/1989 | Bortolin | G02B 6/32 385/84 |
| 5,940,559 A * | 8/1999 | Noll | G01M 11/33 385/53 |
| 5,960,137 A | 9/1999 | Noll | |
| 7,775,725 B2 | 8/2010 | Grinderslev | |
| 9,465,171 B2 | 10/2016 | Grinderslev | |
| 9,989,708 B1 | 6/2018 | Grinderslev | |
| 2010/0202730 A1 | 8/2010 | Farnan | |
| 2021/0199691 A1* | 7/2021 | Piels | G01R 31/318511 |
| 2023/0185274 A1* | 6/2023 | Asadi-Zanjani | G05B 19/4097 700/98 |

FOREIGN PATENT DOCUMENTS

| | | | | |
|---|---|---|---|---|
| CN | 203732664 U | * | 7/2014 | |
| CN | 106368676 A | * | 2/2017 | ............. E21B 47/00 |
| CN | 107300549 A | * | 10/2017 | ............. G01N 21/01 |
| CN | 109497964 A | * | 3/2019 | ............ A61B 5/0075 |
| CN | 111006854 A | * | 4/2020 | ............. G01M 11/02 |

OTHER PUBLICATIONS

European Search Report, International App. 23209196.7-1001 International Filing Date Apr. 8, 2024.

* cited by examiner

*Primary Examiner* — Balram T Parbadia
*Assistant Examiner* — Mary A El-Shammaa

(57) ABSTRACT

A fiber optic connector test probe for testing a device under test (DUT) having at least one DUT terminus, said test probe comprising (a) a cable having first and second ends, (b) a connector to which said first end is terminated, said connector adapted for connection to a light transmitter or receiver, and (c) a test terminus to which said second end is terminated, said test terminus being one of a pin terminus or a socket terminus, said test terminus comprising an optical element to expand/focus said light such that said test terminus is an expanded beam connector, wherein said first or second termini are configured to mate with said DUT terminus.

9 Claims, 8 Drawing Sheets

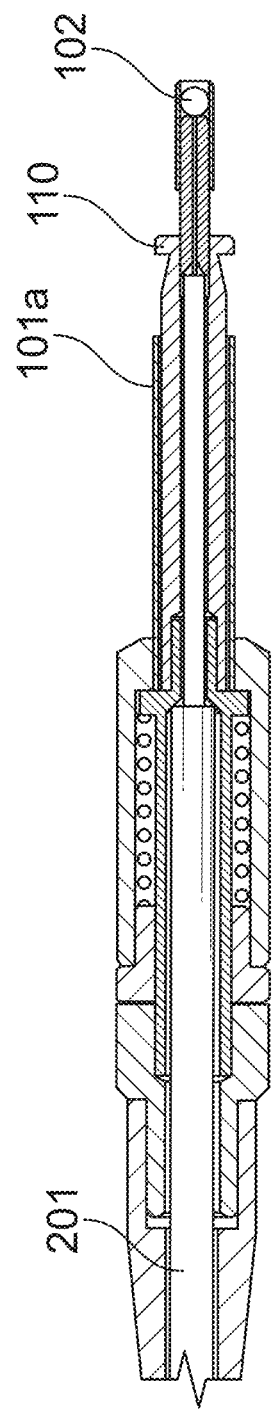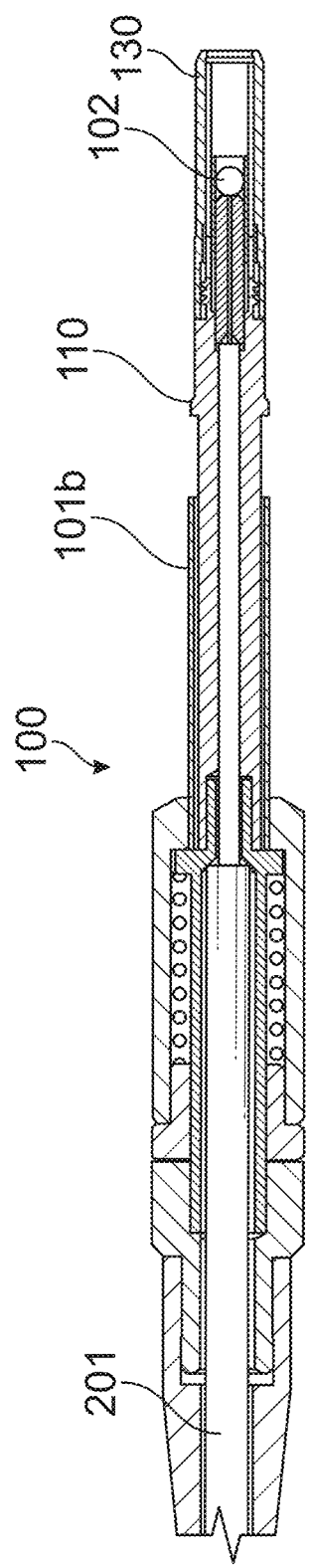
FIG. 1A
FIG. 1B

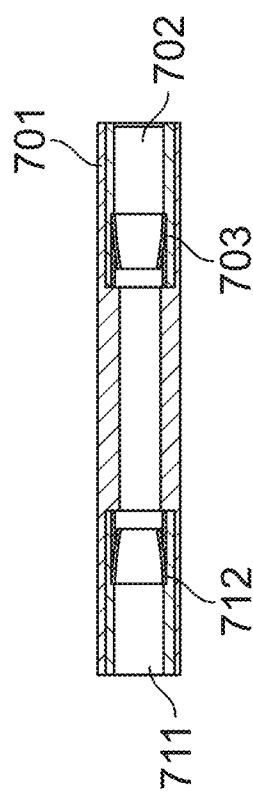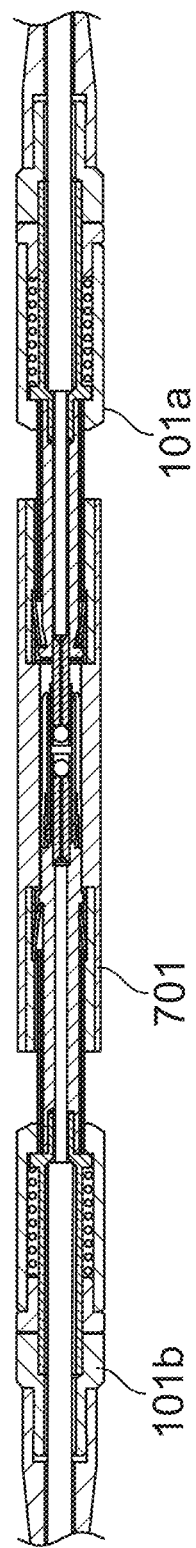
FIG. 7
FIG. 8

TEST PROBE FOR EXPANDED BEAM CONNECTOR

FIELD OF INVENTION

The present invention relates, generally, to testing optical connectors, and, more specifically, to testing expanded-beam termini-type connectors.

BACKGROUND OF INVENTION

Optical fiber connectors are a critical part of essentially all optical fiber communication systems. For instance, such connectors are used to join segments of fiber into longer lengths, to connect fiber to active devices, such as radiation sources, detectors and repeaters, and to connect fiber to passive devices, such as switches, multiplexers, and attenuators. The principal function of an optical fiber connector is to hold the fiber end such that the fiber's core is axially aligned with an optical pathway of the mating structure. This way, light from the fiber is optically coupled to the optical pathway.

Of particular interest herein, are multi-cavity, termini-type connectors. Such connectors typically comprise an outer housing defining a plurality of cavities for holding termini (see, e.g., U.S. Pat. No. 7,775,725). Over the years, multi-cavity connectors have evolved into a ruggedized connector system, comprising an outer housing, which is configured to mate with the outer housing of a mating connector, typically through a screw connection. Numerous United States Military specifications describe such multi-cavity connectors and fiber optic terminals, including, for example, MIL-C-38999, MIL-C-5015 and MIL-T-29504, among others.

Also of particular interest herein are expanded beam (EB) termini used in multi-cavity connectors as disclosed for example in U.S. Pat. Nos. 7,775,725, 9,989,708, and 9,465, 171. The EB terminus described in these patents does not require a spring-loaded mating force. Instead, these termini makes use of an optical lens to expand and collimate the beam for a non-contacting transfer of the optical signal through the air space at the mating interface. Due to the non-contact beam collimation the need for a spring is eliminated and the relative terminus position requirements can be relaxed.

Optical devices, such as optical cable harnesses, need to be tested to verify their optical performance. The method of fiber optic cable testing procedure involves a launch and receive leads. The launch and receive leads will typically have a mating terminus installed on its free end. These termini are of the same type as the terminus on each end of the device under test (DUT), and are configured to optically couple with them. A standard test usually involves first obtaining a reference measurement P1 of the mated launch and receive cables. Next, the DUT assembly is connected between the now unmated launch and receive termini, and a second measurement P2 is now taken. The difference (P2-P1) will establish the optical loss which is typically measured in decibels (dB).

In a conventional test probe, as disclosed, for example, in U.S. Pat. No. 5,960,137, it is essential that the launch and DUT fibers makes physical contact (PC) during the measurement to facilitate the optical signal transmission from one fiber to the other with minimal obstructions. The PC is achieved by using a spring which will urge the fiber carrying ferrule endfaces to meet inside of an alignment sleeve. These types of termini require installation in a connector having integral features intended to retain the terminus relative to each other with a distance that causes a spring force activation. Specifically, an alignment sleeve is integrated in a special adapter to accommodate the test probe. A spring is also instrumental for proper engagement contact. Not only is a special adapter necessary, but a unique special adapter is required for each pin and socket terminus for each connector size.

A convention test probe also requires use of an insertion tooling every time a launch or receive lead is mated to a DUT terminus inside a connector, and likewise, use of a removal tool each time the launch and receive leads are removed from the connector. The tool must be placed carefully around the fiber cable and then pushed into the connector for the insertion or release. When the terminus is inserted, it will pass a retainer component having resilient fingers which will snap into place behind the terminus shoulder once the shoulder section has passed. This will retain the terminus position and partially compress the spring to keep it activated. The removal tool will reverse this action by splaying the fingers thus allowing the terminus shoulder to pass during the removal. To perform these actions, a precise dimensional difference is required between the diameters of the respective insertion and removal tools.

Because these dimensional differences are so small and precise, the insertion and removal tool ends specified for use with different PC termini look very similar. It is however necessary to ensure that the correct tool is selected. To this end, the tools are often color coded. Yet, each time a terminus is tested, the installation and removal tools must be selected carefully and positioned properly. This is particularly problematic with termini-type connectors as these connectors tend to have multiple channels. For example, the 38999 circular connector may have tens of channels. It becomes a very tedious and cumbersome task to use the tools for each of installation and removal of each channel.

Therefore, Applicant recognizes the need to simplify the test probes used for testing DUTs having termini by eliminating springs, adapters, and special insertion/removal tooling. The present invention fulfills this need, among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to an expanded beam (EB) test probe comprising a set of EB pin and socket termini cables. Due to the non-contact beam collimation, the need for a spring to ensure PC is eliminated, and the relative terminus position requirements can be relaxed. Applicant recognizes that, because the EB allows for a relaxed tolerance in the axial and radial alignment of the mating terminus, the EB test probe avoids the aforementioned problems of conventional PC test probes.

In one embodiment, the EB test pin and socket termini are received in standard connector components, thereby eliminating the need for springs and special adapters. More specifically, unlike the prior art test probe in which an alignment sleeve is integral to a special adapter, one embodiment of an EB test socket terminus of the present invention has an integral alignment sleeve, thus eliminating the need for any special adapter and allowing use of a simple, empty standard connector half.

Additionally, the relaxed tolerances allow for a built-in actuator on the terminus in one embodiment to facilitate installation and removal of the terminus in the DUT. The advantage of the design is that need to select and use a special tool for insertion or retraction is eliminated. In one embodiment, the insertion process does not require an insertion tool but only requires a forward push of the tool/terminus end until a retainer is engaged. The release and removal of the test probe from the retainer (fingers) is easily done by pushing the release tube forward to push the retainer fingers out of the way so the test probe can freely be pulled out.

As mentioned above, a PC terminus requires a retainer in order to activate the mating spring force, which means it can only be tested when mounted in a connector. A further advantage of the EB test probe of the present invention is that a connector is not necessary for test or reference measurement of the EB test probes. The alignment split sleeve contained in the EB socket exerts a radial clamping force around the mated ferrules and is sufficient to hold the ferrules in clamped alignment during measurement. Thus, the test probes mates equally well to the standard expanded beam termini so that a test probe pin, for example, will mate with a DUT socket or to a Test Probe socket and vice versa. This means that any DUT harness cable assembly can be tested against a Reference quality Test Probe both internal and external to a connector. The test probes can be used for test of a DUT cable assembly prior to installation in the connector, or after the harness installation and even on site, in an aircraft, for example. To this end, in one embodiment, a feed-through single channel adapter is provided with retainer clips, and can be used to perform either a reference calibration of the mated test probes before the test is performed, or directly test a terminus of a DUT.

In one embodiment, the present invention relates to a fiber optic connector test probe for testing a device under test (DUT) having at least one DUT terminus, the DUT comprising either a first plug or a first receptacle, wherein the first plug is configured to mate to a second receptacle, and the first receptacle is configured to mate with a second plug, wherein the first and second plugs are identical and the first and second receptacles are identical, wherein each of the first and second plugs, and the first and second receptacles define at least one cavity, and wherein the DUT terminus is disposed in the cavity of the first plug or the first receptacle. The test probe comprises: (a) a cable having first and second ends; (b) a connector to which the first end is terminated, the connector adapted for connection to a light transmitter or receiver; and (c) a test terminus to which the second end is terminated, the test terminus being one of a pin terminus or a socket terminus, the test terminus comprising an optical element to expand/focus the light such that the test terminus is an expanded beam connector, wherein the first or second termini are configured to mate with the DUT terminus.

BRIEF DESCRIPTION OF FIGURES

FIGS. 1A and 1B show a cross-sectional view of the test pin terminus and the test socket terminus, respectively, of one embodiment of the test probe of the present invention.

FIG. 7 shows one embodiment of an adapter of the present invention for connecting two EB termini.

FIG. 8 shows a cross-sectional view of the adapter of FIG. 7 coupling the termini of FIGS. 1A and 1B.

DETAILED DESCRIPTION

Figure 2A:
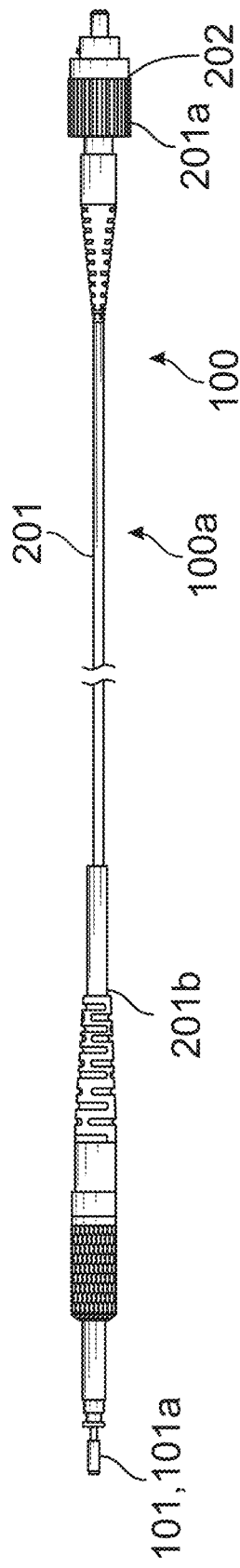
FIGS. 2A and 2B show one embodiment the test pin probe and the socket test probe, respectively, of the present invention.
Figure 2B:
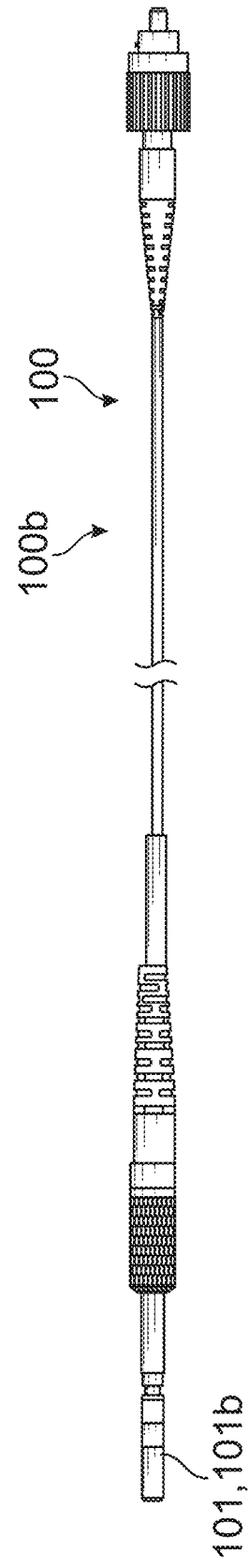

Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The test probe is configured for testing a device under test (DUT) having at least a plug connector or a receptacle connector defining at least one cavity having a DUT terminus disposed therein. For example, referring to FIG. 9, the DUT is a harness 900 comprising a cable 901 terminated with a first plug connector 902 at one end, and with a first receptacle connector 903 at the other end. The plug and receptacle connectors may be any known connectors for facilitating termini connections such as the plug and receptacle MIL-38999 connectors 1012, 1011 shown in FIG. 10. The first plug 902 is configured to mate to a second receptacle 912, and the first receptacle 903 is configured to mate with a second plug 913. The first and second plugs are identical and the first and second receptacles are identical. Each of the first and second plugs, and the first and second receptacles define at least one cavity, and wherein DUT termini are disposed in the cavities of the first plug and first receptacle. For example, referring to back to FIG. 10 the plug and receptacle connectors 1012, 1011 comprise cavities 1050, 1051, containing DUT termini 1001, 1002, respectively.

Figure 9:
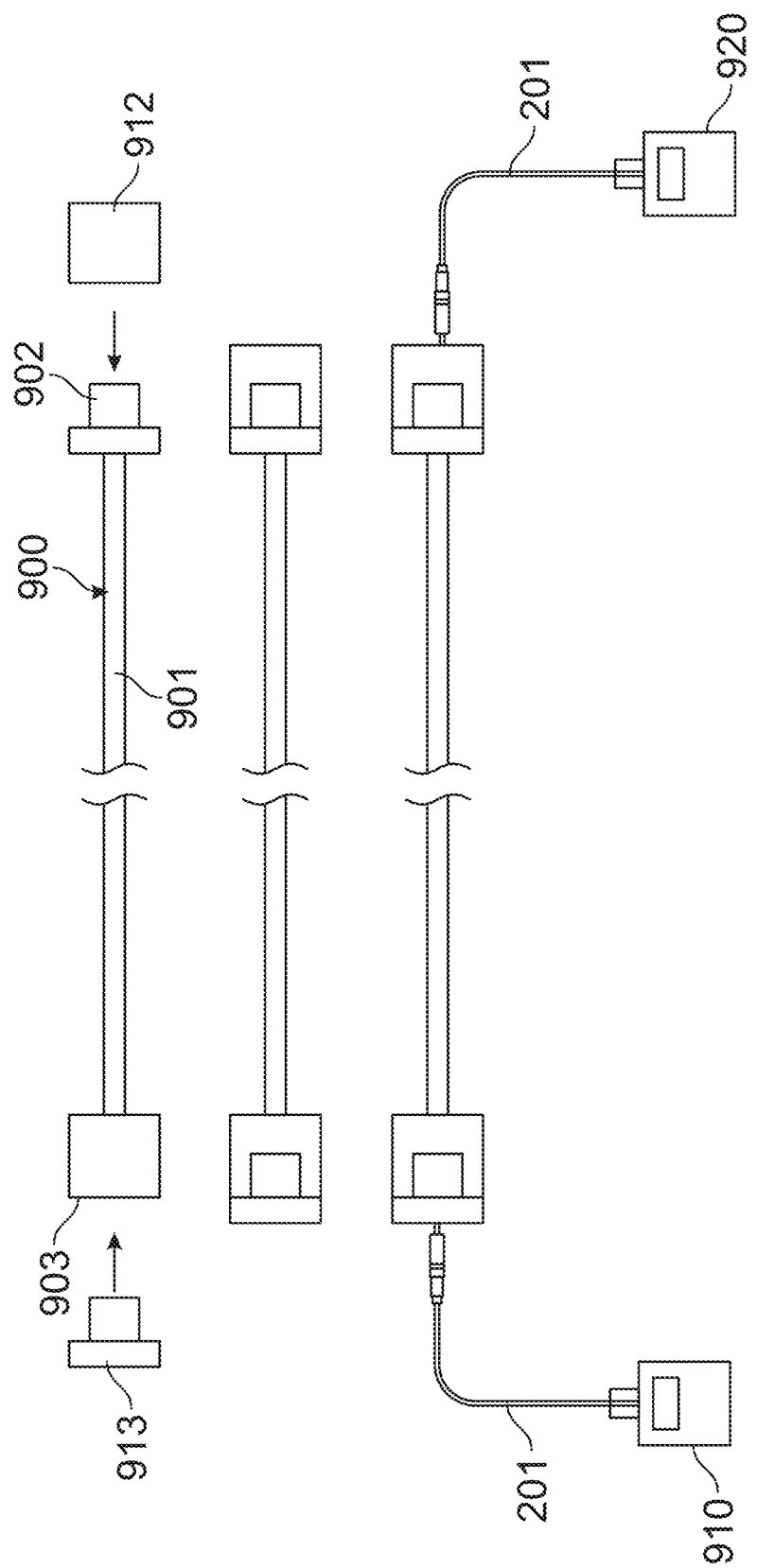
FIG. 9 shows a schematic of a device under test (DUT) where the launch and receive test probes of FIG. 10 are connected to the DUT for measurement optical losses.
Figure 10:
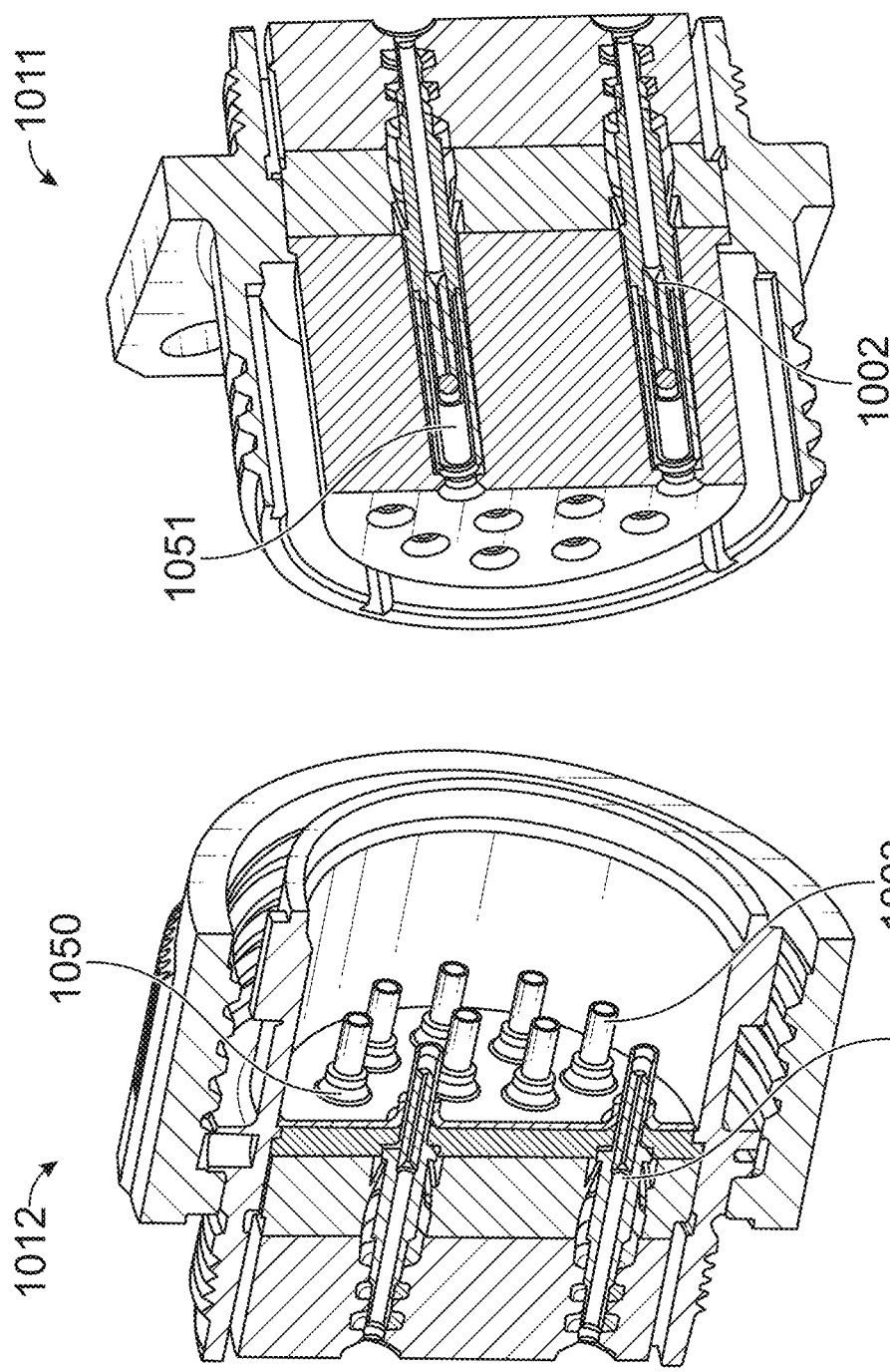
FIG. 10 shows an example of DUT termini in the 38999 shells.

Referring to FIGS. 1A&B and 2A&B, one embodiment of a set of test probes of the present invention is shown. In this embodiment, the test probe comprises a cable 201 having first and second ends 201a, 201b. The first end is terminated to a connector 202 adapted for connection to a light transmitter 910 or receiver 920 as shown in FIG. 9, and the second end is terminated to a test terminus 101. The test probe 100 is one of a test pin probe 100a having a test pin terminus 101a, or a test socket probe 100b having a test socket terminus 101b. The test terminus comprises an optical element 102 to expand and collimate the light such that the test terminus is an expanded beam connector. The test pin terminus 101a and the test socket terminus 101b are configured to mate with the DUT socket and pin termini, respectively.

Toolless Connection/Disconnection

In one embodiment, the test probe of the present invention optically couples with the DUT terminus without the need for insertion/removal tooling or adapter interfaces. For example, referring to FIG. 4, the test terminus 101, which, in this depiction, is a socket terminus 101b, is received in the cavity of the second receptacle, and connects directly to the DUT terminus disposed in the cavity of the first plug, thereby eliminating the need for any non-connector test components to facilitate the connection between the test probe and the DUT terminus (e.g., test adapter, retainer washer, or compression spring).

Figure 3:
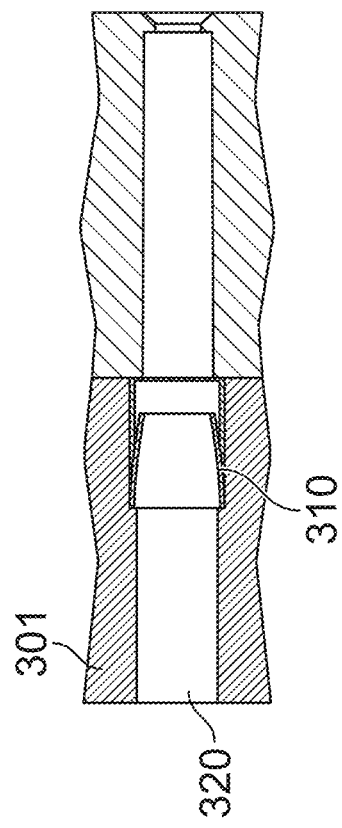
FIG. 3 is a cross-sectional view of one embodiment of a receptacle connector of the present invention having a retainer clip, and connected to a plug connector.

More specifically, referring to FIG. 3, the second receptacle 301 comprises a retainer clip 310 in the cavity 320. It should be understood that although a second receptacle is depicted herein, the same configuration reply to a second plug. In other words, the second plug also comprise a retainer clip its cavity. In this embodiment, the test terminus 101 comprises a ridge 110 for releasably engaging with the clip. As the test terminus is inserted into the cavity, the clip is urged outwardly as the ridge 110 passes through it, until the ridge 110 is passed the clip, at which point, the resilient clip snaps inwardly, and thereby prevents the ridge 110 from withdrawing from the cavity.

Figure 4:
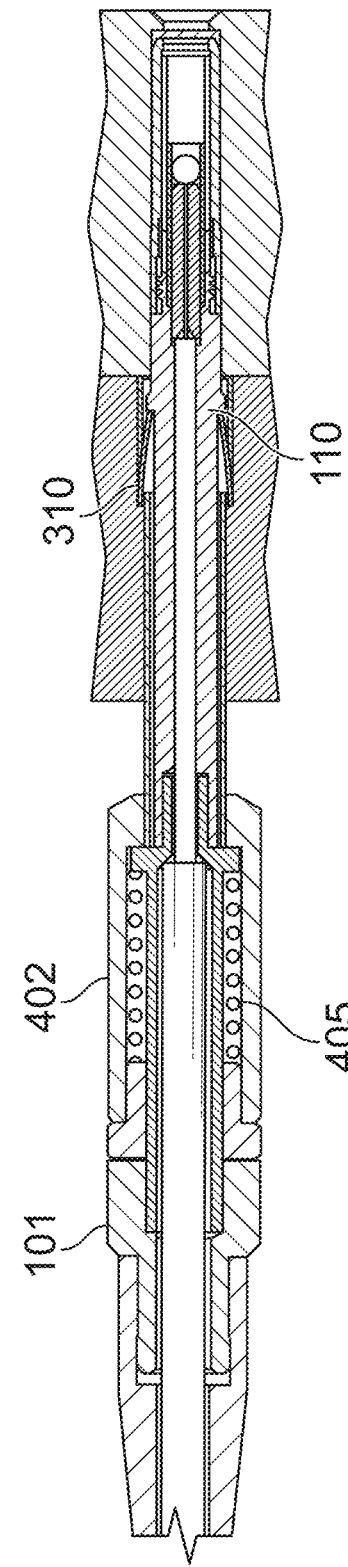
FIG. 4 shows a cross-sectional view of the test socket terminus of FIG. 1B inserted in the receptacle connector of FIG. 3, with the actuator in a rest position.
Figure 5:
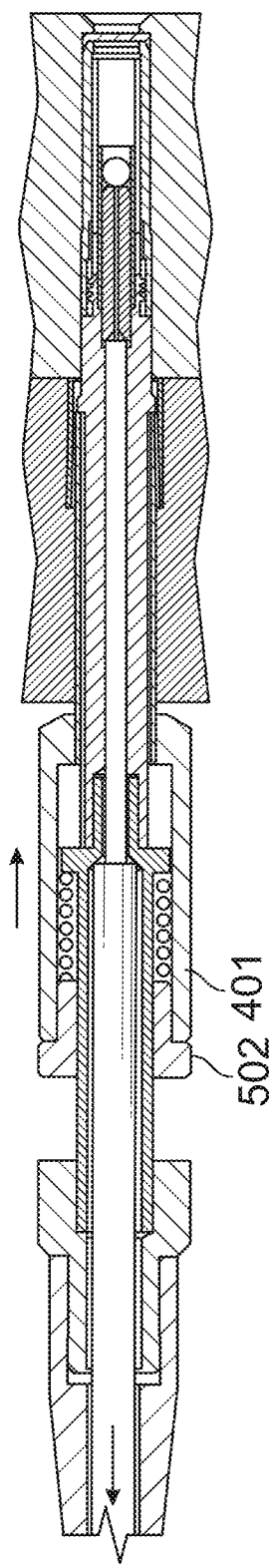
FIG. 5 shows a cross-sectional view of the test socket terminus of FIG. 1B disposed in the receptacle connector of FIG. 3 with the actuator in the actuation position thereby releasing the retainer clip from the terminus.
Figure 6:
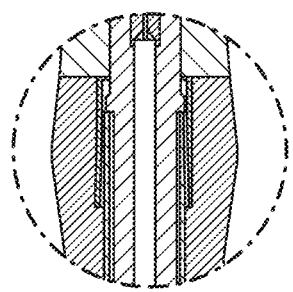
FIG. 6 shows a cross-sectional close-up views of the retainer clip in FIG. 4 engaging with the terminus, and the retainer clip of FIG. 5 being urged upward by the actuator to release the terminus.
Figure 6:
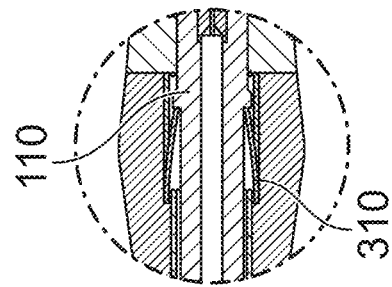

As described in the Background section, a conventional test probe requires installation and removal tools to couple/decouple the test probe from the DUT device. However, unlike the prior art test probes, in one embodiment of the present invention, the test probe comprises a self-contained actuator for releasing it from the retainer clip. More specifically, referring to FIGS. 4 and 5, in one embodiment, the test terminus 101 comprises a slidably-mounted actuator 401, which has a rest position 402 as shown in FIG. 4, and an actuated position 502 shown in FIG. 5. As is shown in FIG. 4, when the test terminus is disposed in the cavity of the second receptacle, the clip is free to engage with the ridge to hold the test terminus axially in the cavity when the actuator is in the rest position. However, as shown in FIG. 5, when the actuator is in the actuated position, the clip is held outwardly by the actuator, preventing the clip from engaging with the ridge to hold the test terminus axially within the cavity, thereby allowing for its withdrawal.

Thus, the integral/built-in actuator of the test probe makes the release process of the terminus from the retainer very quick and the release tool cannot be misplaced as it is designed in as an integral part of the test probe cable assembly.

In one embodiment, the actuator 401 comprises a spring 405 which biases the actuator in the rest position. It should be understood, however, that the spring is not necessary for the actuator's performance.

Although the embodiments of the actuator may vary, in one embodiment, the actuator is tubular. Still other embodiments will be obvious to those of skill the art in light of this disclosure.

In one embodiment, the test socket terminus 101b comprises a compliant alignment sleeve 130 for receiving the DUT pin terminus and holding the DUT pin terminus in radial alignment with the test terminus. Likewise, in one embodiment, the test pin terminus is received in a compliant alignment sleeve of the DUT socket terminus, thereby holding the test terminus in radial alignment with the DUT socket terminus. In one embodiment, the compliant alignment sleeve is a split sleeve.

Terminus-to-terminus Adapter

Figure 11:
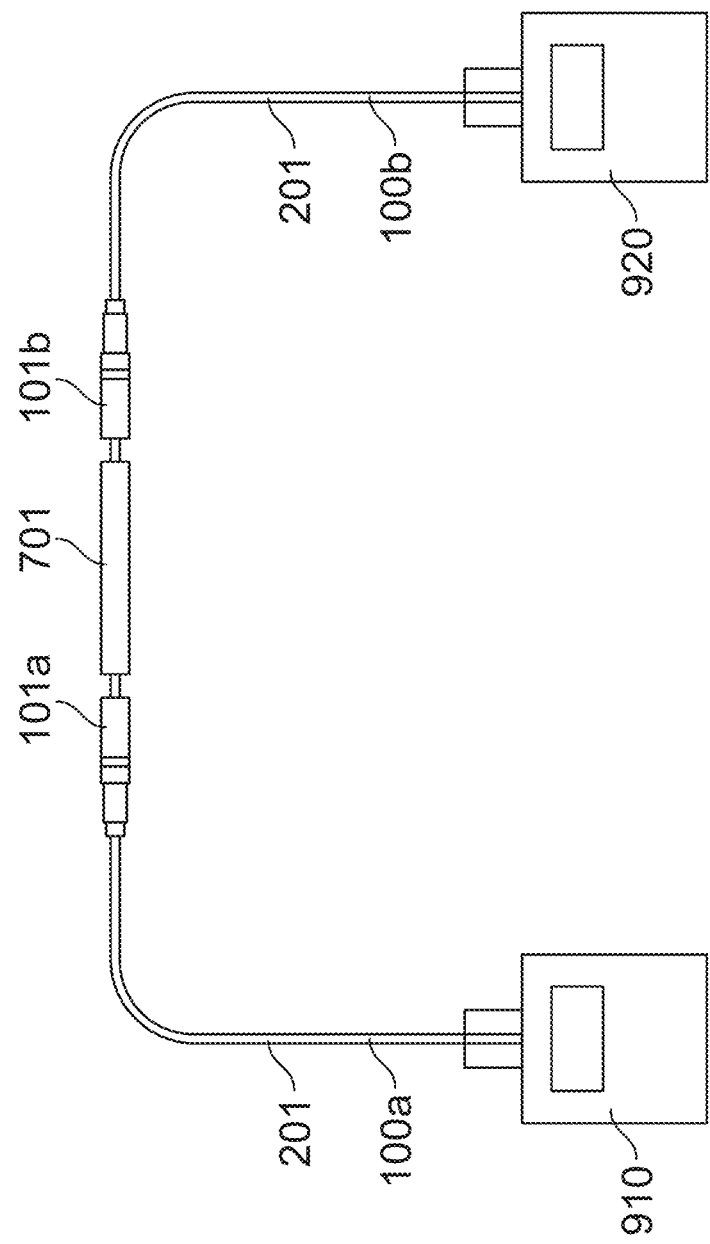
FIG. 11 shows a schematic of the pin and socket test probes being optically coupled in a calibration adapter and referenced to zero.

As is known, the test probes are manufactured with high precision components selected to achieve a reference quality performance which typically is better than the actual product being tested. Nevertheless, the test probes do have losses and those losses need to be determined so they can be zeroed out when measuring the DUT. To this end, in one embodiment, a test pin terminus is optically coupled to test socket terminus. In one embodiment, the test probe of the present invention lends itself to convenient calibration. More specifically, referring to FIGS. 7 and 8, in one embodiment, the invention also comprises a terminus-to-terminus adapter 701 comprising a first cavity 702 with a first retainer clip 703 for receiving the test pin terminus 101a of one test probe, and a second cavity 711 with a second retainer clip 712 for receiving the test socket terminus 101a of another test probe. In one embodiment, the socket terminus comprises an alignment sleeve 130 for receiving and holding the pin terminus in radial alignment. In one embodiment, the adapter 701 is symmetrical, meaning the first and second cavities and retainer clips are identical. Referring to FIG. 8, the adapter 701 is shown with the test pin terminus 101a and the test socket terminus 101b disposed ion the first and second cavities respectively. FIG. 11 shows how to eliminate the loss of the mated high precision test pin and socket probes by referencing the power meter to zero. When that is done, the DUT is then connected between the two test probe ends to measure the DUT loss as is shown in FIG. 9.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A fiber optic connector test probe for testing a device under test (DUT) having at least one DUT terminus, said DUT comprising either a first plug or a first receptacle, wherein said first plug is configured to mate to a second receptacle, and said first receptacle is configured to mate with a second plug, wherein said first and second plugs are identical and said first and second receptacles are identical, wherein each of said first and second plugs, and said first and second receptacles define at least one cavity, and wherein said DUT terminus is disposed in said cavity of said first plug or said first receptacle, said test probe comprising:
   a cable having first and second ends;
   a connector to which said first end is terminated, said connector adapted for connection to a light transmitter or receiver; and
   a test terminus to which said second end is terminated, said test terminus being one of a pin terminus or a socket terminus, said test terminus comprising an optical element to expand/focus said light such that said test terminus is an expanded beam connector, wherein said test terminus is configured to mate directly with said DUT terminus.

2. The test probe of claim 1, wherein said optical element is one of a ball lens, a drum lens, a Graded Index Lens (GRIN), or a plano-convex lens.

3. A fiber optic connector test probe for testing a device under test (DUT) having at least one DUT terminus, said DUT comprising either a first plug or a first receptacle, wherein said first plug is configured to mate to a second receptacle, and said first receptacle is configured to mate with a second plug, wherein said first and second plugs are identical and said first and second receptacles are identical, wherein each of said first and second plugs, and said first and second receptacles define at least one cavity, and wherein said DUT terminus is disposed in said cavity of said first plug or said first receptacle, said test probe comprising:
- a cable having first and second ends;
- a connector to which said first end is terminated, said connector adapted for connection to a light transmitter or receiver; and
- a test terminus to which said second end is terminated, said test terminus being one of a pin terminus or a socket terminus, said test terminus comprising an optical element to expand/focus said light such that said test terminus is an expanded beam connector, wherein said test terminus is configured to mate with said DUT terminus, and
- wherein said test probe is received in said cavity of said second receptacle or said second plug, and connects directly to the DUT terminus disposed in said cavity of said first plug or said first receptacle, thereby eliminating the need for any specialized adapter to facilitate the connection between said test probe and said DUT terminus.

4. The test probe of claim 3, wherein said second plug and receptacle comprises a retainer clip in said cavity of said second plug and receptacle,
- wherein said test terminus comprises a ridge for releasably engaging with said clip,
- wherein said test terminus comprises a slidably-mounted actuator, said actuator having rest and actuated positions,
- wherein, when said test terminus is disposed in said cavity of said second plug or receptacle, said clip is free to engage with said ridge to hold said test terminus axially in said cavity when said actuator is in said rest position,
- wherein, when said test terminus is disposed in said cavity of said second plug or receptacle, said clip is prevented by said actuator from engaging with said ridge to hold said test terminus axially within said cavity when said actuator is in said actuated position.

5. The test probe of claim 4, wherein said actuator is tubular.

6. The test probe of claim 3, wherein said DUT terminus is one of a DUT pin terminus, or a DUT socket terminus.

7. The test probe of claim 6, wherein said test terminus comprises a compliant alignment sleeve for receiving said DUT pin terminus and holding said DUT pin terminus in radial alignment with said test terminus.

8. The test probe of claim 6, wherein said test terminus is received in a compliant alignment sleeve of said DUT socket terminus, thereby holding said test terminus in radial alignment with said DUT socket terminus.

9. A fiber optic connector test probe for testing a device under test (DUT) having at least one DUT terminus, said DUT comprising either a first plug or a first receptacle, wherein said first plug is configured to mate to a second receptacle, and said first receptacle is configured to mate with a second plug, wherein said first and second plugs are identical and said first and second receptacles are identical, wherein each of said first and second plugs, and said first and second receptacles define at least one cavity, and wherein said DUT terminus is disposed in said cavity of said first plug or said first receptacle, said test probe comprising:
- a cable having first and second ends;
- a connector to which said first end is terminated, said connector adapted for connection to a light transmitter or receiver; and
- a test terminus to which said second end is terminated, said test terminus being one of a pin terminus or a socket terminus, said test terminus comprising an optical element to expand/focus said light such that said test terminus is an expanded beam connector, wherein said test terminus is configured to mate with said DUT terminus; and
- an adapter comprising a first socket cavity with a first retainer clip for receiving said pin terminus of said test terminus, and a second socket cavity with a second retainer clip for receiving said socket terminus of said test terminus, wherein said socket terminus comprises an alignment sleeve which receives and holds said pin terminus in radial alignment;
- wherein each of said pin terminus and said socket terminus comprises a ridge for releasably engaging with said first and second clips, respectively,
- wherein each of said pin terminus and said socket terminus comprises a slidably-mounted actuator, said actuator having rest and actuated positions,
- wherein, when said pin terminus is disposed in said cavity of said second plug or receptacle, said clip is free to engage with said ridge to hold said pin terminus axially in said cavity when said actuator is in said rest position,
- wherein, when said pin terminus is disposed in said cavity of said second plug or receptacle, said clip is prevented by said actuator from engaging with said ridge to hold said pin terminus axially within said cavity when said actuator is in said actuated position;
- wherein, when said socket terminus is disposed in said cavity of said second plug or receptacle, said clip is free to engage with said ridge to hold said socket terminus axially in said cavity when said actuator is in said rest position,
- wherein, when said socket terminus is disposed in said cavity of said second plug or receptacle, said clip is prevented by said actuator from engaging with said ridge to hold said socket terminus axially within said cavity when said actuator is in said actuated position.

* * * * *